United States Patent
Jacks

[19]

[11] Patent Number: 5,857,609
[45] Date of Patent: Jan. 12, 1999

[54] PORTABLE ELECTRIC DESOLDERING TOOL

[75] Inventor: David Carl Jacks, Pomona, Calif.

[73] Assignee: Cooper Industries, Inc., Houston, Tex.

[21] Appl. No.: 694,446

[22] Filed: Aug. 12, 1996

Related U.S. Application Data

[63] Continuation-in-part of Ser. No. 287,547, Aug. 8, 1994, Pat. No. 5,544,803.

[51] Int. Cl.$^6$ ........................................................ B23K 3/03
[52] U.S. Cl. ............................................ 228/20.5; 219/230
[58] Field of Search ................................ 228/20.1, 20.5, 228/46, 51–53; 219/230

[56] References Cited

U.S. PATENT DOCUMENTS

| | | | |
|---|---|---|---|
| 3,172,382 | 3/1965 | Weglin | 228/20.5 |
| 3,870,023 | 3/1975 | Wilson | 119/159 |
| 4,328,920 | 5/1982 | Vella | 228/20.5 |
| 4,471,898 | 9/1984 | Parker | 228/20.5 |
| 4,568,819 | 2/1986 | Stacconi | 228/51 |
| 4,574,994 | 3/1986 | Rauchwerger | 228/20.5 |
| 4,768,699 | 9/1988 | Abbagnaro | 228/102 |
| 4,892,995 | 1/1990 | Del Pino Millan | 228/20.1 |
| 5,080,277 | 1/1992 | Diaconu et al. | 228/51 |
| 5,135,153 | 8/1992 | Hooriani | 228/20.5 |
| 5,544,803 | 8/1996 | Jacks | 228/20.5 |

FOREIGN PATENT DOCUMENTS

| | | |
|---|---|---|
| 0 417 923A1 | 3/1991 | European Pat. Off. . |
| 26 44 946 | 4/1978 | Germany . |

OTHER PUBLICATIONS advertisement by Den–On Instruments, Inc. "Desoldering in the Future Today" appearing in U.S. Tech, Aug. 1992 issue.

*Primary Examiner*—Samuel M. Heinrich
*Attorney, Agent, or Firm*—Burns, Doane, Swecker & Mathis LLP

[57] ABSTRACT

The present invention is directed to a self-contained desoldering gun having a built-in vacuum pump. The vacuum pump is operated by a low voltage electric motor which is electrically connected in at least partial series with a heating tip. The heating tip reduces the voltage in the circuit and reduces the size of the motor required to operate the pump. In exemplary embodiments, a portion of the heating tip which is not in partial series with the motor is electrically connected in parallel with the motor. In alternate embodiments, the heating tip can include separately formed first and second heating elements, the first heating element being connected in parallel with the motor and the second heating element being connected in series with the motor. Such a configuration allows the second heating element to be energized only when the motor of the vacuum pump is energized. In yet other embodiments, a multi-position switch is used in conjunction with any of the above-described embodiments, and/or is used in still further embodiments to place the vacuum pump in series with a single heating element during operation of the vacuum pump.

18 Claims, 3 Drawing Sheets

PORTABLE ELECTRIC DESOLDERING TOOL

CROSS-REFERENCES TO RELATED APPLICATIONS

This application is a continuation-in-part of U.S. Ser. No. 08/287,547 filed on Aug. 8, 1994, now U.S. Pat. No. 5,544,803, the contents of which are hereby incorporated by reference in their entirety.

BACKGROUND OF THE INVENTION

1. Field of the Invention

This invention relates to desoldering tools in general, and in particular to a desoldering tool with a built in vacuum pump.

2. State of the Art

Currently most desoldering in the electronics trade is done with desoldering systems which consist of an electrical power base and desoldering handpiece. The base typically includes a pump and a transformer. The base is connected to the desoldering handpiece by an electric cord and a vacuum tube.

The base sits on an electronics workbench while the operator holds the desoldering handpiece as they work. These systems are typically priced at more than $300 per unit.

The electrical desoldering tool must perform several functions. The tool generates heat at a tip which is applied to circuit board components and melts the bonding solder holding components to the board. The tool also supplies a vacuum to draw the molten solder into a reservoir in the handpiece.

Present desoldering devices are cumbersome. They require an electric cord attached to the gun to energize the heating element for melting the solder. In addition, a vacuum hose must be attached to the gun to remove the melted solder from the circuit board. These two appendages must be dragged around by the operator. The vacuum pump and transformer are usually mounted on a bench in the vicinity of the desoldering operation.

The principal disadvantage of this type of system is the lack of portability due to the handpiece being tied to the base by an electrical cord and a pneumatic tube. This gives the operator the ability to move only about 4 to 5 feet from the base.

A prior art attempt to manufacture a self contained desoldering gun placed a vacuum pump in the handle of the desoldering gun. This eliminates the need for a pneumatic tube connected to the base. Typically, the motor used to power the vacuum pump operated with line voltage motors, which are large and heavy. These AC electric motors operate at 100 or 120 volts and require significant insulation and weight. Consequently, the portable tool itself becomes large, heavy, and difficult to handle, especially over extended periods of time.

SUMMARY OF THE INVENTION

The present invention is directed to a self-contained desoldering gun having a built-in vacuum pump. The vacuum pump is operated by a low voltage electric motor which is electrically connected in at least partial series with a heating tip. The heating tip reduces the voltage in the circuit and reduces the size of the motor required to operate the pump. In exemplary embodiments, a portion of the heating tip which is not in partial series with the motor is electrically connected in parallel with the motor. In alternate embodiments, the heating tip can include separately formed first and second heating elements, the first heating element being connected in parallel with the motor and the second heating element being connected in series with the motor. Such a configuration allows the second heating element to be energized only when the motor of the vacuum pump is energized. In yet other embodiments, a multi-position switch is used in conjunction with any of the above-described embodiments, and/or is used in still further embodiments to place the vacuum pump in series with a single heating element during operation of the vacuum pump.

BRIEF DESCRIPTION OF THE DRAWINGS

The present invention can be further understood with reference to the following description and the appended drawings, wherein like elements are provided with the same reference numerals. Other objects and advantages of the invention will be apparent to those skilled in the art upon reading the following detailed description of preferred embodiments in conjunction with the accompanying drawings, wherein.

DETAILED DESCRIPTION

Figure 1:
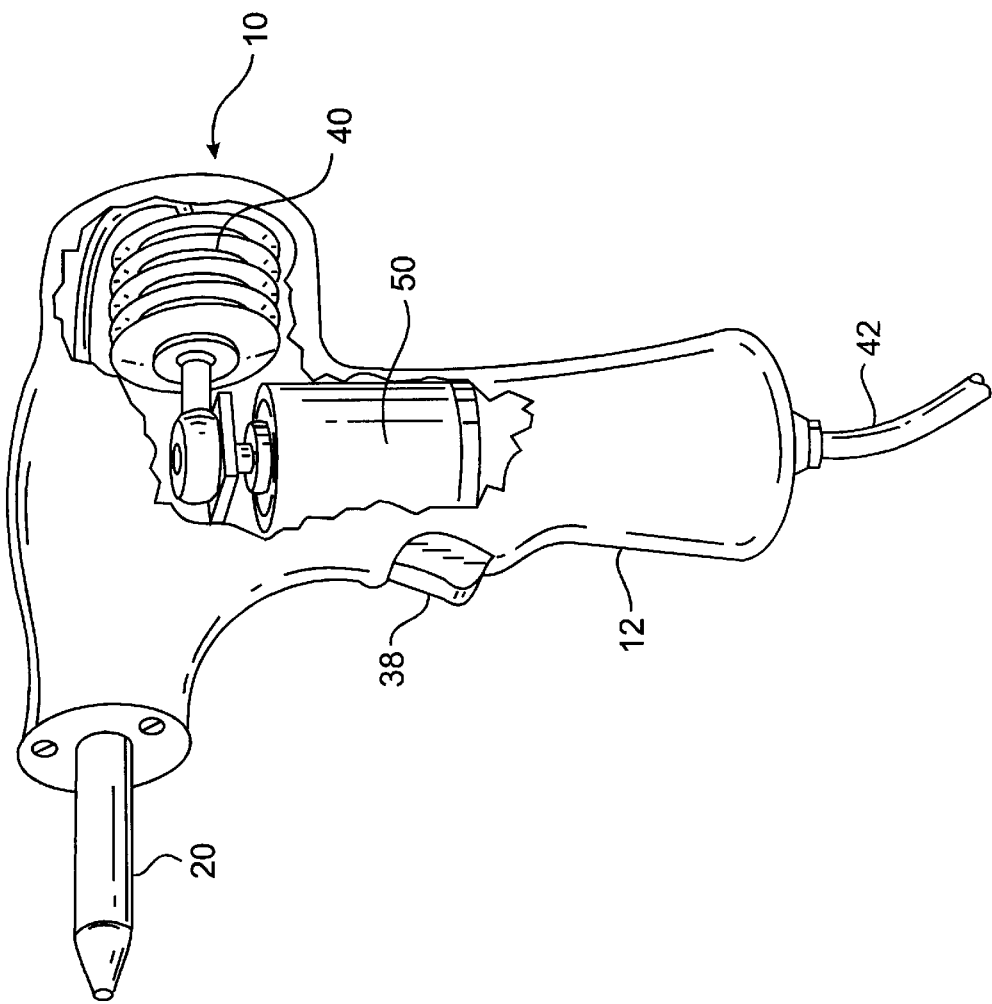
FIG. 1 is a perspective view, partly in section of a desoldering gun according to an exemplary embodiment of the present invention.

Referring to FIG. 1, a desoldering gun according to an exemplary embodiment of the present invention is referred to in general by numeral 10. Major components of desoldering gun 10 are tip 20, electronic circuitry 30, vacuum pump 40, and low voltage DC motor 50. The low voltage DC motor 50 located in the handle of the desoldering gun operates a gun mounted vacuum pump 40. AC line voltage is received through cord 42.

Figure 2:
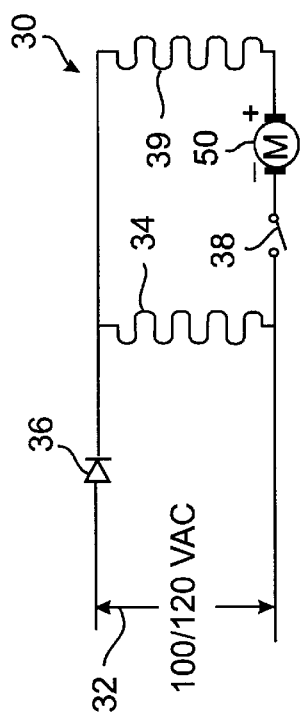
FIG. 2 is a schematic view of a desoldering gun circuit according to an exemplary embodiment of the present invention.

FIG. 2 shows an exemplary circuit of the FIG. 1 desoldering gun. AC line voltage 32 is converted to DC current by rectifier 36 and is reduced in voltage by placing a heating element 34 of the desoldering gun in partial series with the pump motor 50. A portion of the heating element 34 which is not in series with the pump motor 50 is in parallel with the pump motor 50 when the pump motor is energized. Switch 38 is a trigger switch (see FIG. 1) used to energize motor 50 via the series arrangement of switch 38 and motor 50 as shown in FIG. 2.

The present invention solves the problems associated with operating a heavy hand held tool and yields a substantial cost savings. The invention utilizes a low voltage motor 50, for example, a 24 volt DC motor in a preferred embodiment.

The low voltage motor is used without a transformer which reduces weight. This is achieved by utilizing a rectifier 36 to convert the current to DC, and a heater element 34 as part of the voltage drop (IR drop) which reduces the line voltage 32 to the amount required by the DC motor 50. The voltage drop creates heat which is used in the desoldering process.

There are several advantages of using a low voltage motor. Low voltage DC motors are substantially less expensive than line voltage AC motors. Low voltage DC motors are also smaller in size than line voltage AC motors, and hence, yield a smaller and easier-to-handle tool. Low voltage DC motors are also lighter in weight than line voltage AC motors, yielding a lighter desoldering tool and reducing operation fatigue.

Figure 3:
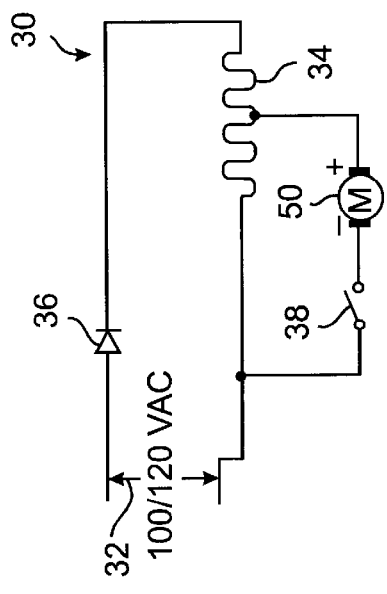
FIG. 3 is a schematic view of an alternate desoldering gun circuit according to an exemplary embodiment of the present invention.

In another embodiment of the invention shown in FIG. 3, a second stage heater 39 is employed in series with the motor and operates only when the pump motor is working to prevent cooling of the desoldering tip 20. This embodiment achieves additional benefits. This embodiment uses the second stage heater 39 when the vacuum pump is energized. When the desoldering tool is being used to melt the solder, only one element represented as a first stage heater 34, placed in parallel with the pump motor 50 and the second stage heater 39, is powered. However, upon reflow of the solder and the subsequent energizing of the vacuum pump, the second stage heater 39 is energized to drop the voltage for the motor. Energizing a second heater eliminates the problem of "heat sinking".

When the desoldering tip touches a component or circuit board, the temperature of the tip will drop as a result of the heat sinking capacities of the component on the printed circuit board. The drop in temperature can hinder reflowing the solder and the success of the desoldering operation. A further complication arises when the vacuum pump is energized and draws cool air over the molten solder. This drops the temperature further. The present invention's use of a second stage sequential heater gives a thermal boost at the time of vacuum pump activation. This assists in maintaining the reflow of the molten solder and prevents further temperature drops.

Figure 4:
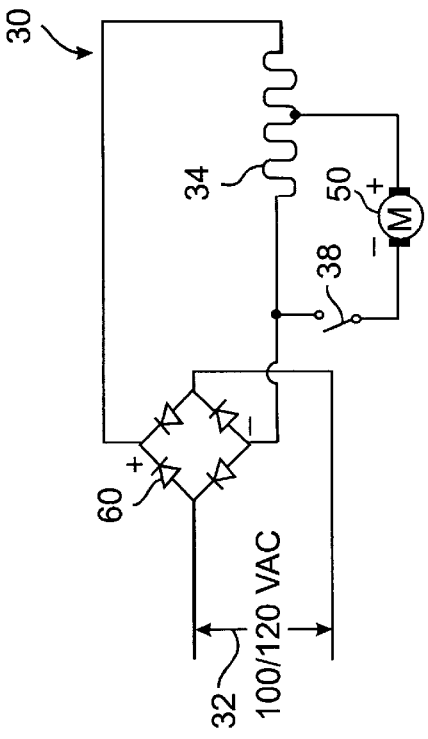
FIG. 4 is a schematic view of another desoldering gun circuit according to an exemplary embodiment of the present invention.
Figure 5:
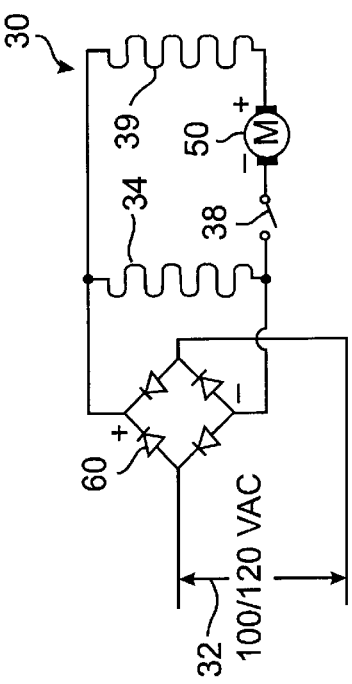
FIG. 5 is a schematic view of another desoldering gun circuit according to an exemplary embodiment of the present invention.

FIGS. 4 and 5 show alternate circuit diagrams which can be used in accordance with the present invention. A bridge circuit 60 is used to rectify line voltage 32 in these embodiments. The FIG. 4 partial series arrangement of a heating element comprising first and second stage heaters 34 and 39, respectively corresponds to that of FIG. 3. The FIG. 5 arrangement of heating element 34 in partial series with pump motor 50 corresponds to that of FIG. 2.

Figure 6:
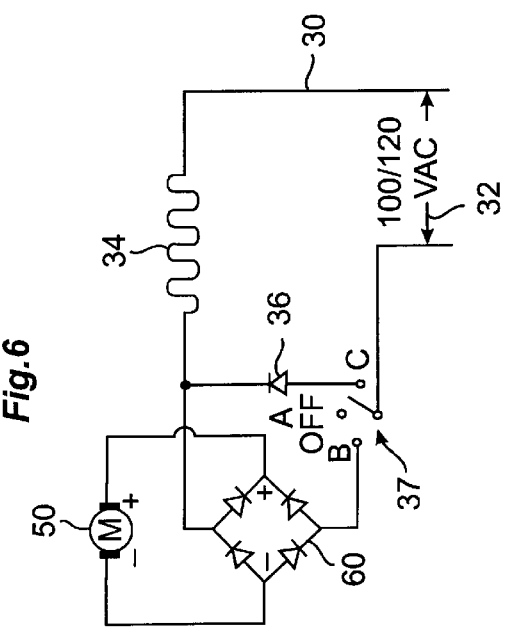

FIG. 6 shows an additional embodiment wherein the circuit uses a three way, multi-position switch 37 to replace the single pole switch 38 of FIGS. 2–5. As shown in FIG. 6, the multi-position switch 37 selectively connects the vacuum motor 50 into the circuit 30. An advantage of using the three way, multi-position switch 37 is that it does not require tapping off the heating element 34, thereby providing an alternate embodiment for eliminating the separate second stage heater 39 used in FIGS. 3 and 4.

As shown in FIG. 6, the multi-position switch 37 can be a three-way switch with a center off position labelled "A". When the switch 37 is placed in the position labelled "C", the heating element 34 is energized via a rectifier 36 formed, for example, as a single diode. However, when the switch 37 is placed in the position labelled "B". The pump motor can be momentarily energized via bridge circuit 60 which rectifies the line voltage. When the rectifying bridge circuit 60 is activated via switch 37, the rectifying diode 36 is open circuited, and vice versa. When the pump motor 50 is activated as a result of placing switch 37 in the position labelled "B", current flows through the motor 50 and the heating element 34 in series. During activation of pump motor 50, the rectified voltage from the AC line voltage 32 is disproportionately divided across the pump motor 50 and the heater element. For example, with a 24 volt pump motor, approximately 40 volts exists across the heater elements (for a 120 volt supply which is rectified to 60 volts DC). As with the earlier described embodiments, the voltage drop across the heater element allows a smaller DC motor to be used. Increased current draw due to the series arrangement of the pump motor 50 and the heating element 34 results in a boosted heat output from the heating element, which counters the cooling effect caused by air flow over the desoldering gun tip.

Figure 7:
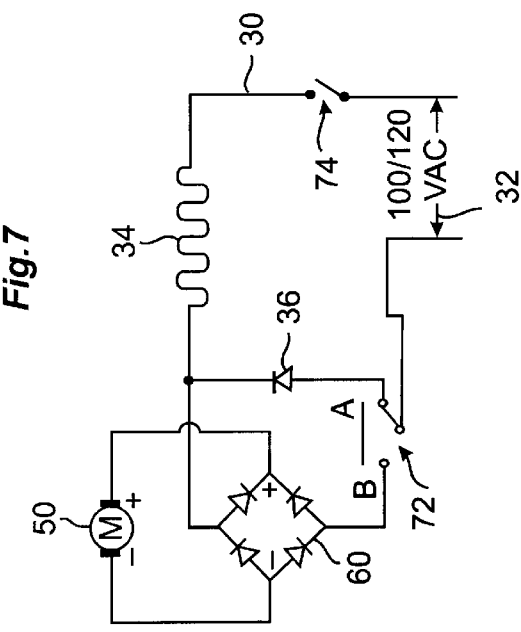
FIGS. 6, 7, and 8 are schematic views of alternate desoldering gun circuits according to still further exemplary embodiments of the present invention.

FIG. 7 shows an exemplary embodiment similar to that of FIG. 6, except that switch 37 is replaced by a single pole, double through switch 72 and a power on/off switch 74. Switch 74 enables the power from AC line voltage 32 to be selectively applied to the circuit, while switch 72 enables selective activation of the heating element 34 only (position "A"), or series activation of the pump motor 50 and the heating element 34 (position "B"). Such a configuration allows the heating element to be continuously activated upon closing of switch 74, with the pump motor 50 being selectively, momentarily activated when desired. This embodiment has a benefit similar to that of the circuit shown in FIG. 6, of not requiring an additional heating element, and does not require switching off the heating element 34 which could cause cooling of the heating tip 20.

Figure 8:
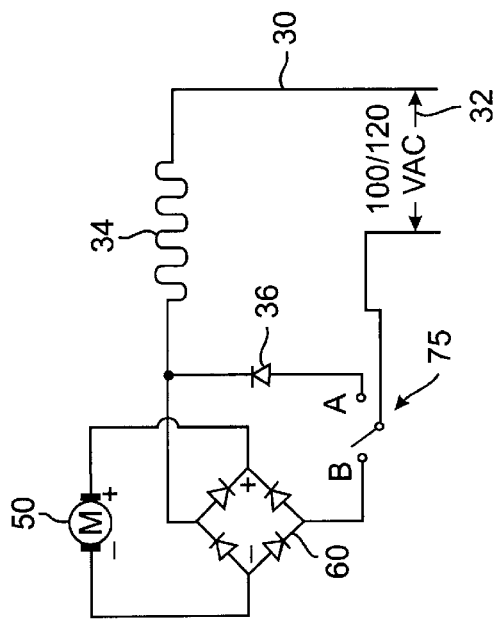

FIG. 8 is similar to FIG. 6, except a single pole double throw switch 75 can be momentarily placed in position "B" to activate a series arrangement of the pump motor 50 and heating element 34, or momentarily placed in position "A" to activate only the heating element 34.

Of course, those skilled in the art will appreciate that the foregoing exemplary embodiments are by way of illustration only, and that numerous variants exist. For example, rather than using a 100/120 volt AC supply, exemplary embodiments can be powered from any 100, 120 or 220 AC supply volts. The multi-position switches of FIGS. 6–8 can be used in the circuits of FIGS. 2–5.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range and equivalence thereof are intended to be embraced therein.

I claim:

1. An electronic desoldering gun comprising:
    a heating tip;
    a vacuum pump connected to said heating tip; and
    an electric motor connected to said pump, wherein at least a portion of said heating tip is electrically connected in series with said motor,
    wherein a first rectifier is connected in series with said heating tip during deactivation of said electric motor, and a second rectifier is connected in series with said electric motor and said heating tip during activation of said electric motor.

2. A desoldering gun as in claim 1, wherein a rectifier is connected in series with said heating tip and said motor.

3. A desoldering gun as in claim 2, wherein said motor is a DC motor.

4. A desoldering gun as in claim 1, wherein said motor is an AC motor.

5. A desoldering gun as in claim 1, wherein said heating tip is in total series with said electric motor during operation of said electric motor.

6. A desoldering gun as in claim 1, wherein a portion of said heating tip which is not electrically connected in partial series with said motor is electrically connected in parallel with said motor.

7. A desoldering gun as in claim 1, wherein said vacuum pump is provided for drawing molten solder during operation of said heating tip.

8. A desoldering gun as in claim 1, wherein said vacuum pump is provided for drawing molten solder and said heating tip includes a first heating element and a separate second heating element, said first heating element being in parallel with said motor and said second heating element being in series with said motor.

9. A desoldering gun as in claim 1, wherein said first rectifier is a single diode.

10. A desoldering gun as in claim 9, wherein said second rectifier is a full bridge rectifier.

11. A desoldering gun as in claim 1, wherein said second rectifier is a full bridge rectifier.

12. An electronic desoldering gun comprising:

heating tip;

vacuum pump connected to said heating tip;

a motor connected to said pump, wherein said motor is connected electrically in series with at least a portion of said heating tip; and a multi-position switch for selectively electrically connecting said motor to said heating tip, wherein said heating tip includes a first heater stage and a second heater stage, said first heater stage being electrically connected in parallel with said motor, and said second heater stage being electrically connected in series with said motor when said motor is energized.

13. A desoldering gun as in claim 12, wherein a rectifier is connected in series with said heater and said motor during activation of said motor.

14. A desoldering gun as in claim 13, wherein said motor is a DC motor.

15. A desoldering gun as in claim 12, wherein said motor is an AC motor.

16. A desoldering gun as in claim 12, wherein said multi-position switch is a three-way switch with an off position.

17. A desoldering gun as in claim 12, wherein said multi-position switch is a single pole double throw switch.

18. An electronic desoldering gun comprising:

a heating tip;

a vacuum pump connected to said heating tip; and an electric motor connected to said pump, wherein said heating tip is electrically connected in partial series with said motor, wherein a first rectifier is connected in series with said heating tip during deactivation of said electric motor.

* * * * *